(12) United States Patent
Schlienger et al.

(10) Patent No.: US 8,743,340 B2
(45) Date of Patent: Jun. 3, 2014

(54) SYSTEM AND METHOD FOR IMAGING APPARATUS CALIBRATION

(75) Inventors: Max Eric Schlienger, Napa, CA (US); Paul Anthony Withey, Derby (GB)

(73) Assignee: Rolls-Royce Corporation, Indianapolis, IN (US)

( * ) Notice: Subject to any disclaimer, the term of this patent is extended or adjusted under 35 U.S.C. 154(b) by 1042 days.

(21) Appl. No.: 12/648,603

(22) Filed: Dec. 29, 2009

(65) Prior Publication Data

US 2010/0271608 A1    Oct. 28, 2010

Related U.S. Application Data

(60) Provisional application No. 61/203,970, filed on Dec. 31, 2008.

(51) Int. Cl.
G03B 27/42 (2006.01)

(52) U.S. Cl.
USPC ............ 355/53; 355/77; 353/30; 353/70; 348/222.1; 348/383

(58) Field of Classification Search
USPC .......... 355/53, 55, 63, 67, 77; 353/70, 101, 353/121, 30, 69, 76; 348/222.1, 383, 745, 348/806, 190, 191, 207.1
See application file for complete search history.

(56) References Cited

U.S. PATENT DOCUMENTS

| | | |
|---|---|---|
| 5,038,014 A | 8/1991 | Pratt et al. |
| 5,120,476 A | 6/1992 | Scholz |
| 5,121,329 A | 6/1992 | Crump |
| 5,287,435 A | 2/1994 | Cohen et al. |
| 5,402,351 A | 3/1995 | Batchelder et al. |
| 5,609,814 A | 3/1997 | Takano |
| 5,633,021 A | 5/1997 | Brown et al. |
| 5,651,934 A | 7/1997 | Almquist et al. |
| 5,656,230 A | 8/1997 | Khoshevis |
| 5,922,364 A | 7/1999 | Young, Jr. |
| 6,401,001 B1 | 6/2002 | Jang et al. |
| 6,405,095 B1 | 6/2002 | Jang et al. |

(Continued)

FOREIGN PATENT DOCUMENTS

EP    1 441 514 A2    7/2004

OTHER PUBLICATIONS

European Search Report and Written Opinion, EP 09 01 6138, Mar. 15, 2010, Rolls-Royce Corporation.

(Continued)

*Primary Examiner* — Steven H Whitesell Gordon
*Assistant Examiner* — Mesfin T Asfaw
(74) *Attorney, Agent, or Firm* — Krieg DeVault LLP (57) ABSTRACT

A system is disclosed including an image sensor positioned at a first specified angle relative to a projected image plane. The system includes a projector that projects a test pattern onto the projected image plane. A controller is structured to iteratively adjust the projector focus until an image focus index is maximized, where the image focus index is a function of an amplitude of at least one harmonic frequency of a scan of the test pattern. The controller is further structured to determine a skew indicator value and adjust a projector skew adjustment. The controller is further structured to compare a current zoom level to a target zoom level and adjust a projector zoom. The projected image plane is a manufacturing surface, where the projected image is utilized in a manufacturing process.

36 Claims, 7 Drawing Sheets

(56) References Cited

U.S. PATENT DOCUMENTS

| | | |
|---|---|---|
| 6,607,689 B1 | 8/2003 | Farnworth |
| 6,733,267 B2 | 5/2004 | Chapman et al. |
| 6,841,116 B2 | 1/2005 | Schmidt |
| 2005/0024606 A1 | 2/2005 | Li et al. |
| 2005/0104257 A1 | 5/2005 | Gu et al. |
| 2005/0157270 A1 | 7/2005 | Muraoka et al. |
| 2006/0018004 A1 | 1/2006 | Okano et al. |
| 2006/0192937 A1* | 8/2006 | Kerkhof et al. ............... 355/71 |

OTHER PUBLICATIONS

Extended European Search Report and Written Opinion, EP 13 000 272.8, May 14, 2013, Rolls-Royce Corporation

* cited by examiner

SYSTEM AND METHOD FOR IMAGING APPARATUS CALIBRATION

CROSS REFERENCE TO RELATED APPLICATIONS

The present application claims the benefit of U.S. Provisional Patent application No. 61/203,970 filed Dec. 31, 2008, and is incorporated herein by reference.

FIELD OF THE INVENTION

The present invention relates to automatic projector calibration, and more particularly relates to automatic projector calibration in a manufacturing environment.

BACKGROUND

Various manufacturing techniques utilize projected images. For example, ceramic devices may be created with a photosensitive polymer utilized in one of the steps of manufacturing. Manufacturing of sophisticated parts requires that projected images be optimally focused and square, while it is desirable that focusing and image processing require little time and human interaction. Accordingly, there is a demand for further improvements in this area of technology.

SUMMARY

One embodiment is a unique system for calibrating a projection system in a manufacturing process. Other embodiments include unique methods, systems, and apparatus to calibrate projection systems. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
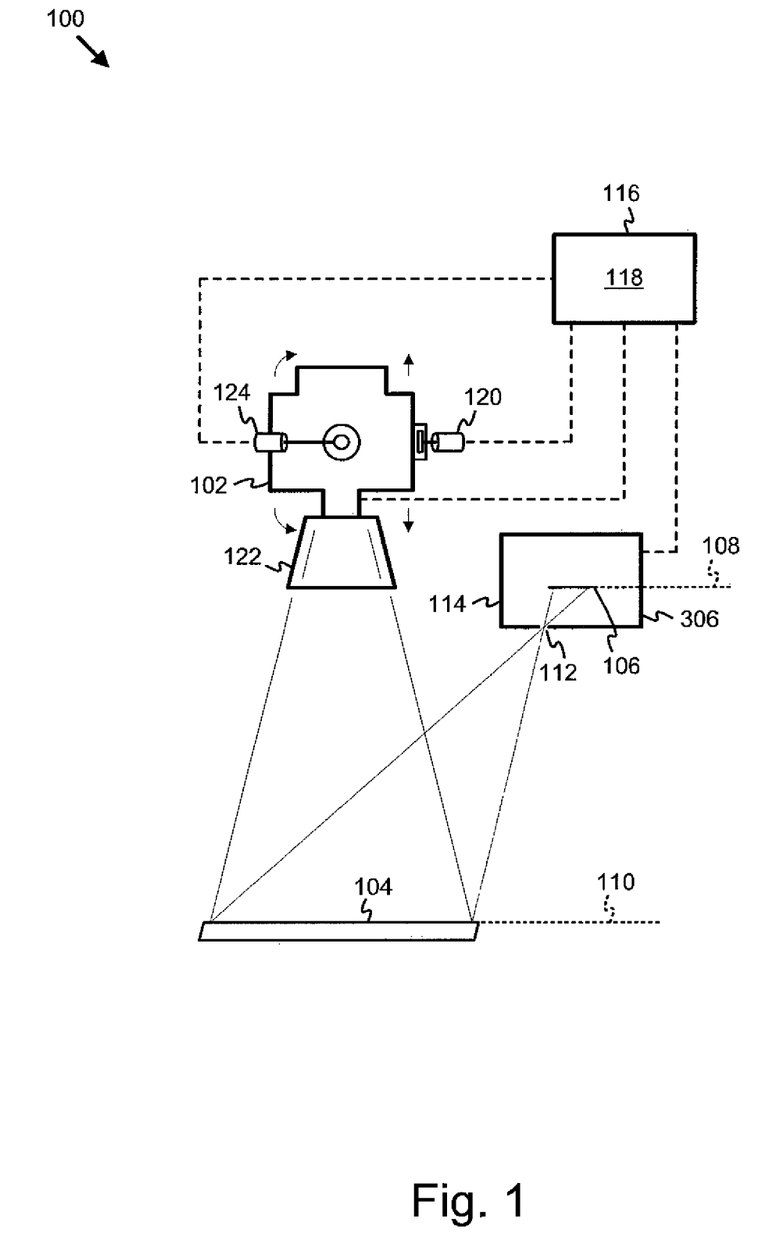
FIG. 1 is a schematic diagram of a system for projector calibration.

FIG. 1 is a schematic diagram of a system 100 for projector calibration. The system 100 includes a projector 102 that projects a test pattern onto a projected image plane 110. In certain embodiments, the projected image plane 110 includes a manufacturing surface which during manufacture includes a projected image 104. For example, the projected image plane 110 may be a location where a photosensitive polymer will be placed during a manufacturing process. The system 100 further includes an image sensor 106 positioned at a first specified angle relative to the projected image plane 110. The first specified angle may be a parallel angle, but may be any other angle where a controller 118 transforms the received image according to a known angle. In one embodiment, the plane 108 of the image sensor 106 is parallel to the projected image plane 110. The image sensor 106 may include any digitally accessible image sensor 106 known in the art, including without limitation a charge coupled device (CCD) array or a complementary semi-oxide conductor (CMOS) array having a plurality of digital "pixels".

In certain further embodiments, a pixel row (not shown) on the image sensor is positioned at a second angle relative to an edge of the test pattern. For example, after the plane 108 of the image sensor 106 is positioned parallel to the projected image plane 110, the image sensor 106 may be rotated until a pixel row of the image sensor 106 (either a horizontal or vertical row) is parallel to an edge (either horizontal or vertical) of the test pattern. In certain embodiments, the second angle is not a parallel angle and the controller 118 commands varying scan angles to determine the highest scanned frequency to determine the test pattern spacing and orientation.

The system 100 includes an aperture 112 positioned between the image sensor 106 and the projected image plane 110. In certain embodiments, the aperture 112 is a pinhole allowing the image sensor 106 to achieve acceptable focus without any control or adjustment. In some cases, a pinhole aperture 112 introduces unacceptable diffraction patterns, and a larger aperture 112, including for example a larger hole with an imager lens (not shown) is utilized. In certain embodiments, the image sensor 106 may be disposed within a housing 114, and the aperture 112 may be an opening in the housing 114.

In certain embodiments, the system 100 further includes a processing subsystem 116 including a controller 118. The processing subsystem 116 includes, in certain embodiments, sensors, actuators, controllers, hardware, software, memory devices, processing devices, communication paths (wired and/or wireless), and other devices or features to functionally perform certain operations and procedures of the system 100. In certain embodiments, a controller 118 is structured to functionally perform certain operations, including in some embodiments focusing, squaring (i.e. correcting skew), and implementing the proper zoom level of the projected image.

In certain embodiments, the controller 118 is structured to iteratively scan the test pattern and adjust a projector focus value to maximize an image focus index. The image focus index is a function of at least one harmonic frequency amplitude of a test pattern scan. For example, the controller 118 my command the image sensor 106 to perform a scan of the test image. The resulting test pattern scan is a digital description of one or more scanned rows through the test pattern, and will be a frequency-based description of the image information. For example, the resulting test pattern scan may be a fast Fourier transform (FFT) of the scanned rows. Although an FFT is a possible frequency-based description, any frequency-based information capture system understood in the art is contemplated in the present application, including without limitation Fourier transforms calculated by some other method than an FFT algorithm, a sine transform (or discrete), a cosine transform (or discrete), and a modified Laplace and/or Z-transform.

In certain embodiments, a properly designed test pattern—for example a square wave pattern with an appropriate frequency (e.g. in cycles/inch)—yields a series of frequency peaks with amplitudes, the first frequency peak comprising the fundamental frequency and the later peaks comprising harmonic frequencies. The exact shape and nature of the peaks depends upon the test pattern and transform used. In one example, a square wave test pattern is used with a sine transform, and the first peak is the fundamental frequency, the second peak is the third harmonic frequency, the third peak is the fifth harmonic frequency, and so forth.

The image focus index is a function of at least one harmonic frequency amplitude of the test pattern scan. For example, the image focus index may be the amplitude (or root mean squared (RMS)) value of a first harmonic frequency (i.e. the third harmonic, or the first harmonic peak appearing). In certain embodiments, the image focus index includes an RMS amplitude for the first harmonic frequency divided by an RMS amplitude for the fundamental frequency, a sum of RMS amplitude values for more than one harmonic frequency divided by the RMS amplitude for the fundamental frequency, and/or a sum of all RMS amplitude values for harmonic frequencies having an amplitude higher than a threshold divided by the RMS amplitude for the fundamental frequency. For example, a threshold may be any RMS amplitude value that is higher than 1% of the RMS amplitude for the fundamental frequency.

In certain embodiments, the controller 118 is structured to adjust a projector focus value to maximize the image focus index. In certain further embodiments, the controller 118 adjusts the projector focus value by commanding a projector lens position actuator (not shown) and/or a projection distance actuator 120. In the illustration of FIG. 1, the projection distance actuator 120 is shown as an electric motor structured to move the projector 102 closer or further from the projected image plane 110, but any type of projection distance adjustment is contemplated in the present application. The projector lens 122 may be adjustable in certain embodiments by a projector lens position actuator (not shown). The controller 118 maximizes the image focus index by any known optimization routine, for example by adjusting the focusing actuator in small increments, and finding the maximum when a convergence occurs—such as a small change in the focusing actuator yielding less than a threshold improvement of the image focus index.

In certain embodiments, the projector 102 includes a skew adjustment (e.g. electronic actuator 124). Skew as used herein can be a geometric concept—for example the projected image is trapezoidal shaped, such as longer at the top than the bottom (vertical skew) or longer on one side than the other (horizontal skew), or a brightness concept—for example the image is darker on one side of the projected image with the same intended color. A skew adjustment may occur by a change in camera position (e.g. rotating the camera horizontally as shown in FIG. 1 by actuator 124, or rotating the camera in a vertical plane (not shown)), by a change in a CRT scan pattern, by a change in a digital projector boost level for certain pixels, or other adjustments understood in the art.

In certain embodiments, the projector skew adjustment is a horizontal skew correction, a vertical skew correction, and/or a projector position, and the controller 118 is structured to determine the skew indicator value and to tune the projector skew adjustment in response to the skew indicator value. In certain embodiments, the skew indicator value is a ratio of a first fundamental frequency to a second fundamental frequency. For example, the first fundamental frequency may be a fundamental frequency of a scan at the top of the test pattern while the second fundamental frequency may be a fundamental frequency of a scan at the bottom of the test pattern.

Tuning the projector skew adjustment may include the controller 118 manipulating the skew adjustment until the skew indicator value has a predetermined value. For example, if the top and bottom of the test scan include square waves of identical frequency, then a ratio of the first fundamental frequency to the second fundamental frequency ($\lambda_{top}/\lambda_{bottom}$) is targeted at a value of one. Other values are possible—for example where the square wave at the top has a frequency double that of the square wave at the bottom, the ratio of the first fundamental frequency to the second fundamental frequency is targeted at a value of two.

In certain embodiments, the amplitude of the fundamental frequencies of the top and bottom (or first and second side) scans may be utilized to determine and adjust skew. For example, the projector 102 may not achieve the same level of brightness on the projected image plane on one side compared to the other, and the projector 102 may include adjustments (e.g. boosting power projected on certain pixels in a digital projector) that can compensate. Further, in certain embodiments, the skew indicator value may be determined from other parameters than the fundamental. For example, the skew indicator value may be determined from the first harmonic value (e.g. the frequency associated with the third harmonic in a sine transform embodiment) and the controller 118 may tune the skew adjustment in response to the skew indicator value.

In certain embodiments, the controller 118 is further structured to interpret a target zoom level, to determine a current zoom level, and to control the current zoom level in response to the target zoom level. For example, the target zoom level may comprise a projection size, magnification ratio, percentage of an available projection area that should be used, or similar parameter understood in the art to describe a zoom level of a projected image. In the example, the controller 118 may determine the current zoom level by determining the fundamental frequency and converting the fundamental frequency into a current zoom level. The controller 118 may utilize the cycles per distance represented by the fundamental frequency, the number and size of pixels in the image sensor 106, the number and size of pixels in the projected image, and/or any other available information to determine the current zoom level. In certain embodiments, the controller 118 is structured to determine the current zoom level by interpreting a target fundamental frequency, and interpreting the fundamental frequency for the test pattern. In certain embodiments, the controller 118 adjusts a projector distance and/or projector lens position to control the current zoom level in response to the target zoom level. In certain further embodiments, the controller 118 performs a re-focus of the projected image in response to an adjustment of the current zoom level.

Figure 2:
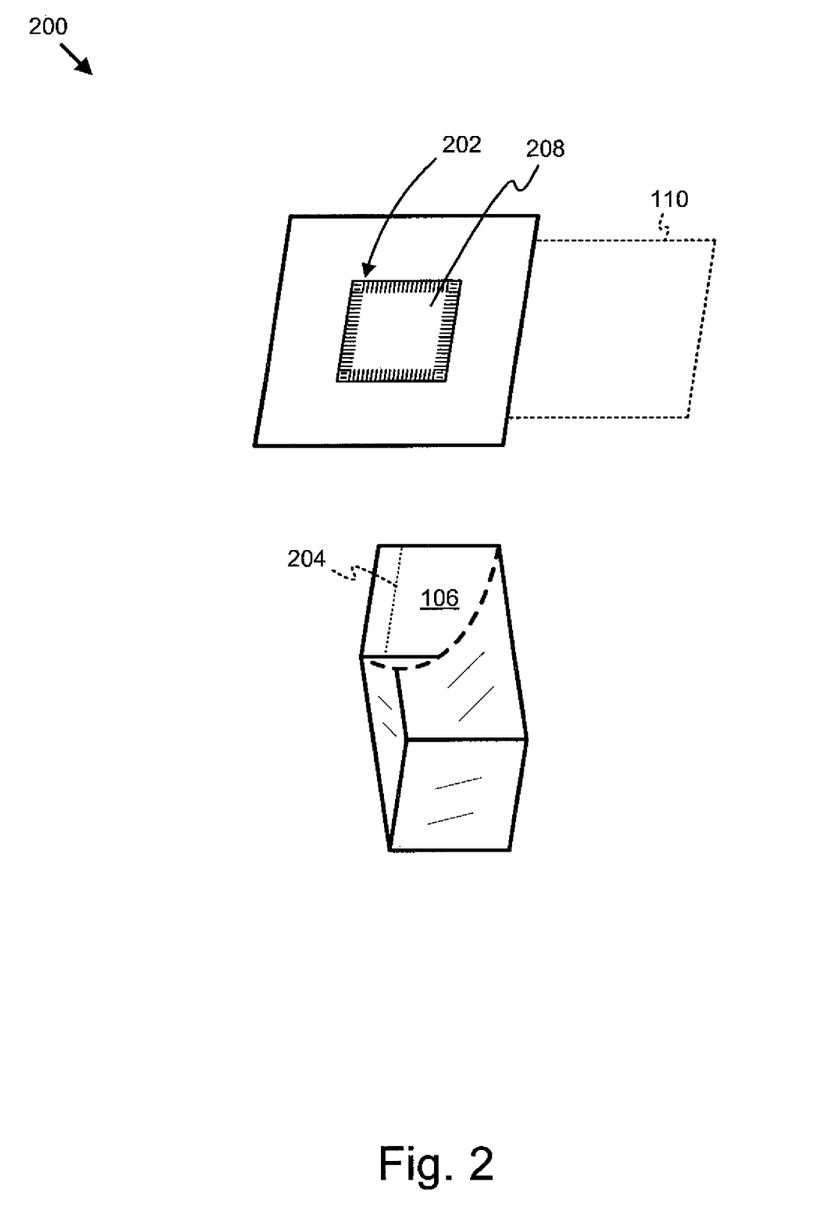
FIG. 2 is an image sensor positioned parallel to a projected image plane.

FIG. 2 is an image sensor 106 positioned at a first specified angle (parallel, in the illustration) relative to a projected image plane 110. The image sensor 106 includes a plane of sensing elements (e.g. each representing a "pixel"), and the plane of the image sensor 106 is positioned parallel to the projected image plane 110. In certain embodiments, the image sensor 106 is rotated after the planes 110, 108 are positioned at the first specified angle, such that a pixel row 204 on the image sensor 106 is at a second angle to an edge 202 of a test pattern 208 projected onto the projected image plane 110. In the illustration of FIG. 2, a vertical pixel row 204 is aligned with a vertical edge 202 of the test pattern 208. However, any orientation of the pixel rows 204 to the test pattern 208 edges is contemplated herein.

Figure 3:
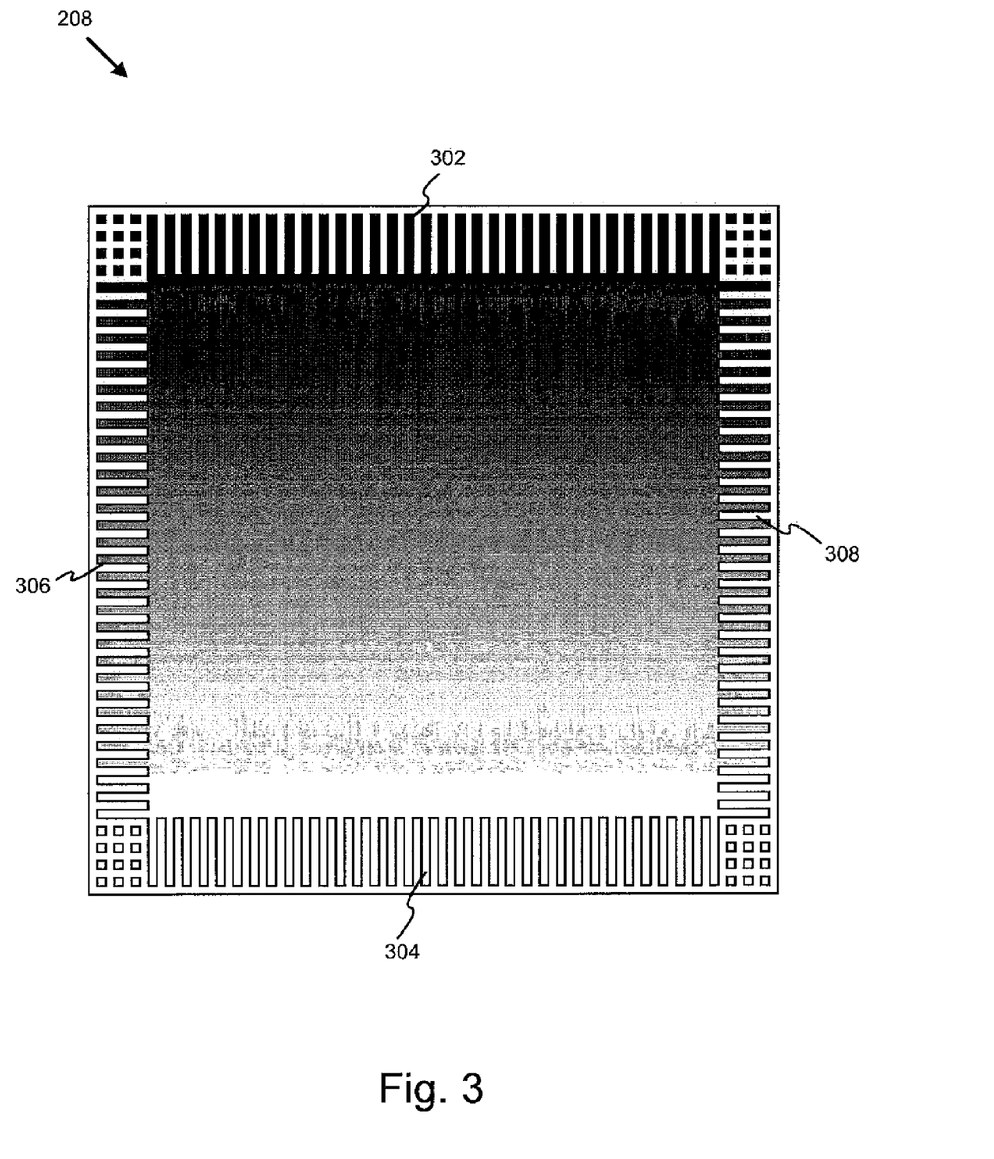
FIG. 3 is an exemplary test pattern.

FIG. 3 is an exemplary test pattern 208. The exemplary test pattern 208 includes a first square wave sequence 302 at the top, and a second square wave sequence 304 at the bottom. The exemplary test pattern 208 further includes a third square wave sequence 306 at a left side and a fourth square wave sequence 308 at a right side. Each square wave sequence 302-308 is at a specified frequency (e.g. in cycles/inch), but each square wave may be at the same or a different frequency. In the example, each square wave is at the same frequency.

In certain embodiments, the image sensor 306 performs multiple scans on a square wave sequence 302 from the test pattern 208 and the controller 118 performs focusing operations until the projected image 104 is optimally focused. In certain further embodiments, the image sensor 306 then performs multiple scans on opposing square wave sequences 302, 304 and/or 306, 308 and the controller 118 performs skew adjustment operations until the projected image 104 is optimally square. In certain further embodiments, the image sensor 306 performs at least one scan on a square wave sequence 302, 304, 306, 308, determines a current zoom level according to the specified frequency of the square wave sequence and the observed fundamental frequency of the test pattern 208 according to the scan. In certain further embodiments, the controller 118 performs a zoom adjustment to change the current zoom level according to a target zoom level.

Figure 4:
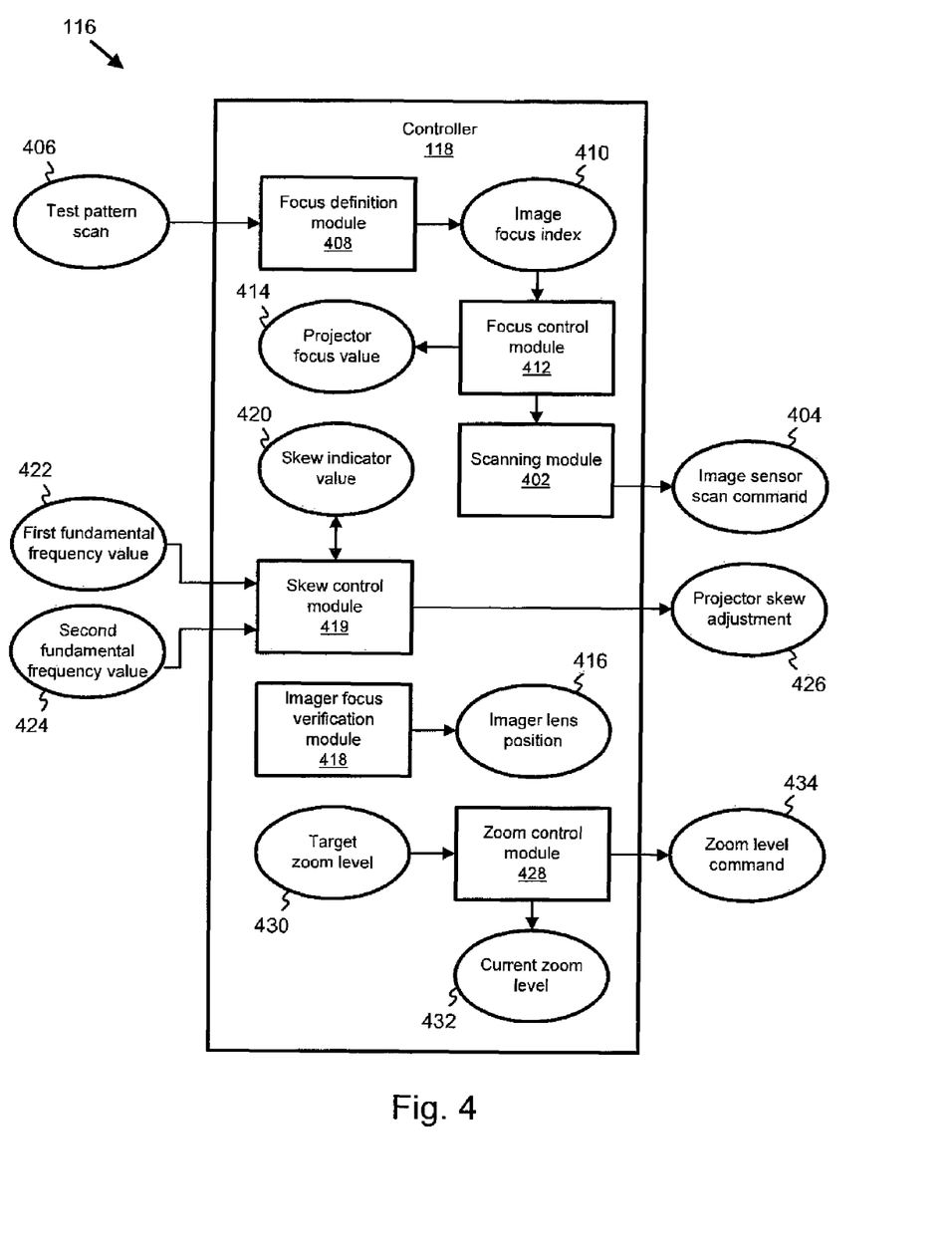
FIG. 4 is a processing subsystem for projector calibration.

FIG. 4 is a processing subsystem 116 for projector 102 calibration. The subsystem 116 includes a scanning module 402 that provides an image sensor scan command 404. The image sensor 106 creates a test pattern scan 406 in response to the image sensor scan command 404. The test pattern scan 406 is a scan (e.g. an optical scan) of the test pattern 208 projected onto a manufacturing surface. In certain embodiments, the test pattern scan 406 includes a digital capture of the information from the scan, including for example a plurality of frequency peaks generated from a fast Fourier transform analysis of the scan data.

The subsystem 116 further includes a focus definition module 408 that determines an image focus index 410 that is a function of at least one harmonic frequency amplitude of the test pattern scan 406. The subsystem 116 further includes a focus control module 412 that iteratively adjusts a projector focus value 414 to maximize the image focus index 410. Maximizing the image focus index 410 includes a naming convention that a larger image focus index 410 indicates a more focused projected image 104, or in one example a higher ratio of the utilized harmonic frequencies to the fundamental frequency. The naming convention may be reversed, such that a smaller image focus index 410 indicates a more focused projected image 104, or in one example a higher ratio of the utilized harmonic frequencies to the fundamental frequency. Any such embodiments, or other equivalents, are contemplated in the scope of the present application.

In certain further embodiments, the focus control module 412 also adjusts an imager lens position 416 to maximize the image focus index 410. The subsystem 116, in certain further embodiments, also includes an imager focus verification module 418 that dithers the imager lens position 416, and the focus control module 412 further re-adjusts the projector focus value 414 in response to the dithering of the imager lens position 416 indicating that the image focus index 410 is not at a maximum value.

For example, the focus control module 412 adjusts the imager lens position 416 and the projector focus value 414 until an optimal image focus index 410 is reached, the imager focus verification module 412 changes the imager lens position 416 to a higher and lower setting (i.e. dithers the imager lens position 416) while the focus definition module 408 recalculates the image focus index 410. If during the dithering, the image focus index 410 increases, the imager lens position 416 is moved until the image focus index 410 has a highest value, and the focus control module 412 re-adjusts the projector focus value 414 to ensure that an optimal image focus index 410 is maintained. The dithering of the imager lens position 416 and re-adjustment of the projector focus value 414 helps ensure that the image focus index 410 is not set at a local maximum but non-optimal value, and the process of dithering the imager lens position 416 may be repeated—for example until the process yields less than a threshold improvement in the image focus index 410.

In certain embodiments, the subsystem 116 includes a skew control module 419 that determines a skew indicator value 420 as a function of a first fundamental frequency value 422 and a second fundamental frequency value 424. The first fundamental frequency value 422 is a fundamental frequency determined from a scan on a first side of the test pattern and the second fundamental frequency value 424 is a fundamental frequency determined from a scan on a second side of the test pattern. The skew control module 419 further tunes a projector skew adjustment 426 in response to the skew indicator value 420.

For example, the test pattern 208 such that the first fundamental frequency value 422 and the second fundamental frequency value 424 should be equal, and the skew indicator value 420 may be a ratio of the first fundamental frequency value 422 divided by the second fundamental frequency value 424. The skew control module 419 may tune the projector skew adjustment 426—for example an actuator 124 position that rotates the projector 102—until the skew indicator value 420 has a value close to one. Any known cause of projected image skew—including at least due to projector 102 position and angle—may be measured by the skew indicator value 420 and adjusted by the projector skew adjustment 426. In certain embodiments, the projector skew adjustment 426 includes a horizontal skew correction, a vertical skew correction, and/or a projector position. In certain embodiments, the skew indicator value 420 includes a ratio of the first fundamental frequency to a second fundamental frequency, and/or a ratio of the first fundamental frequency amplitude to the second fundamental frequency amplitude. In certain embodiments, the skew indicator value 420 includes a horizontal skew indicator value and/or a vertical skew indicator value.

In certain embodiments, the subsystem 116 includes a zoom control module 428 that interprets a target zoom level 430, determines a current zoom level 432, and provides a zoom level command 434 in response to the target zoom level 430. For example, the target zoom level 430 may be a value stored in a memory location of the subsystem 116, which may be stored as a target fundamental frequency or other parameter that may be related to an image size, and the current zoom level 432 may be determined according to a fundamental frequency from the test pattern scan 406. The zoom level command 434 may be a position value for the projector lens, a position value for the projector, or other parameter that adjusts the image size, and the zoom control module 428 may provide a zoom level command 434 such that the current zoom level 432 has a value close to the target zoom level 430.

Figure 5A:
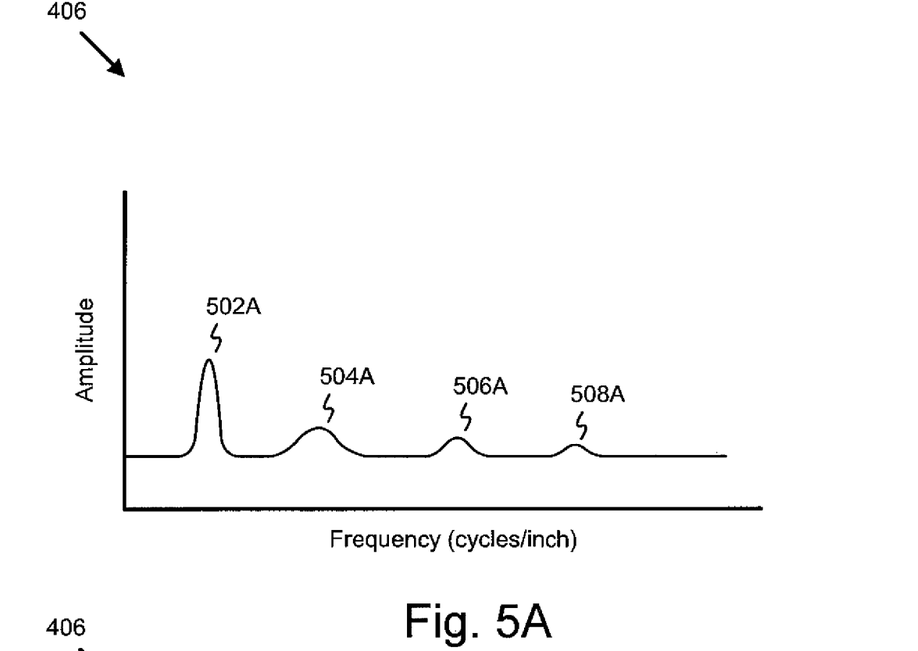
FIG. 5A is a first illustration of a test pattern scan.
Figure 5B:
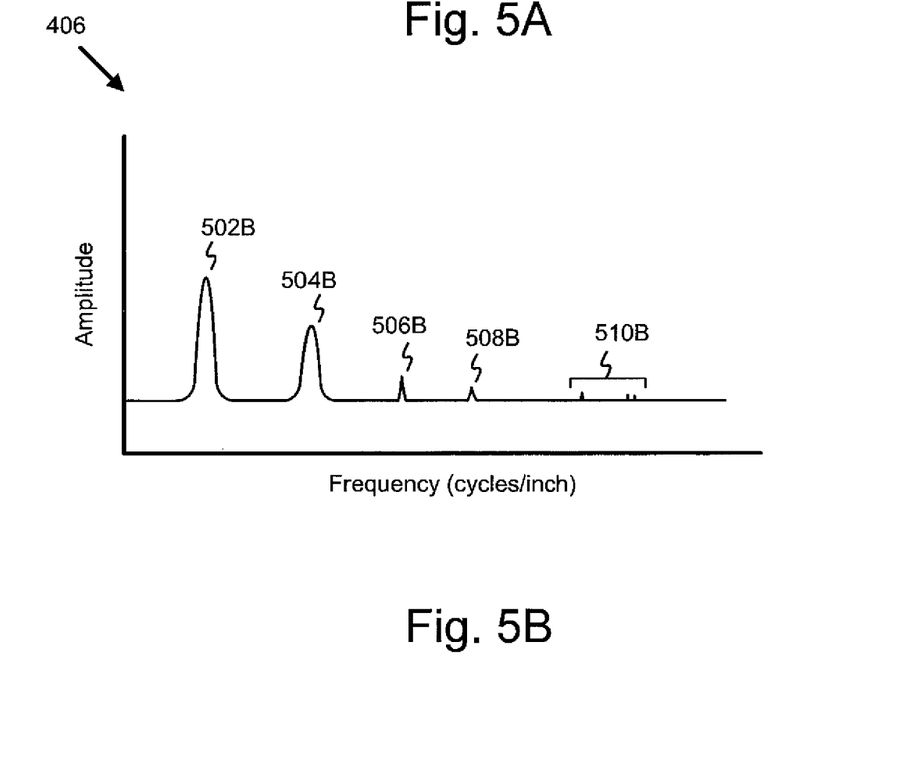
FIG. 5B is a second illustration of a test pattern scan.

FIG. 5A is a first illustration of a test pattern scan 406. The test pattern scan 406 includes a fundamental frequency peak 502A, and several harmonic frequency peaks 504A, 506A, 508A. Referring to FIG. 5B, a second illustration of a test pattern scan 406 includes a fundamental frequency peak 502B, and several harmonic frequency peaks 504B, 506B, 508B. The illustration of FIG. 5B is consistent with the illustration of FIG. 5A, where the illustration of FIG. 5B is closer to a proper focus level. For example, the harmonic peaks in FIG. 5B exhibit a narrower frequency range and higher amplitude than the harmonic peaks in FIG. 5A. The illustration of FIG. 5B shows a number of high frequency peaks 510B that may be higher order harmonics that are too diffuse in FIG. 5A to be seen, or that may be noise that only shows when the projector approaches the optimum focus value—for example scratches on the projector lens, anomalies on the projected image plane 110, diffraction patterns from the aperture 112, or other noise sources known in the art. The high frequency peaks 510B may be utilized in whole or part by the focus control module or may be ignored.

Figure 6:
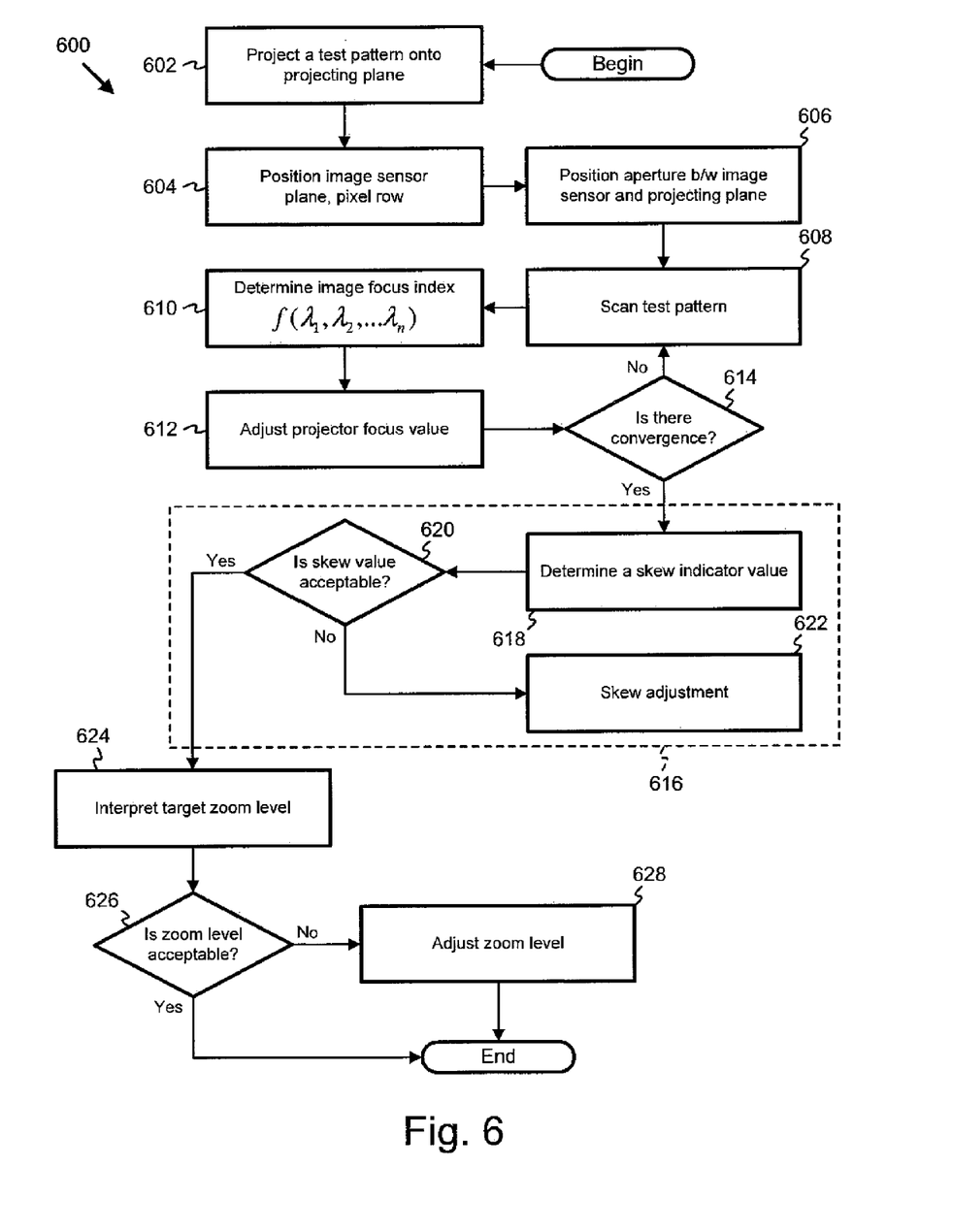
FIG. 6 is a schematic flow diagram of a procedure for calibrating a projector.

FIG. 6 is a schematic flow diagram of a procedure 600 for calibrating a projector. The procedure 600 includes an operation 602 to project a test pattern onto a projection image plane. The procedure 600 further includes an operation 604 to position an image sensor at a first specified angle to the projected image plane and to position a pixel row of the image sensor at a second angle to an edge of the test pattern. The procedure 600 further includes an operation 606 to position an aperture between the image sensor and the projected image plane, and an operation 608 to scan the test pattern.

The procedure 600 further includes an operation 610 to determine an image focus index as a function of a fundamental frequency and one or more harmonic frequencies. The procedure 600 further includes an operation 612 to adjust a projector focus value, and a determination 614 of whether the projector focus value has converged to an optimum value. If the projector focus value has not converged to an optimum value, the procedure 600 iteratively adjusts the projector focus value (i.e. performs operations 608-614) until the projector focus value is optimized. If the projector focus value is optimized, the procedure 600 further includes an operation 616 to tune a projector skew adjustment to optimize a skew indicator value.

The operation 616 to tune the projector skew adjustment includes an operation 618 to determine a skew indicator value, and a determination 620 of whether the skew indicator value is at an acceptable value. If the skew indicator value is not at an acceptable value, the operation 616 to tune the projector skew adjustment includes an operation 622 to adjust the projector skew adjustment, and the operation 618 to determine the skew indicator value. If the skew indicator value is at an acceptable value, the procedure 600 proceeds to an operation 624 to interpret a target zoom level, and a determination 626 whether a current zoom level is acceptable. If the current zoom level is not acceptable, the procedure 600 includes an operation 628 to adjust the current zoom level.

Certain operations of FIG. 6 may be omitted in whole or part, certain operations not shown in FIG. 6 may be added, and operations may be performed in a different order or performed in an alternate manner.

Figure 7:
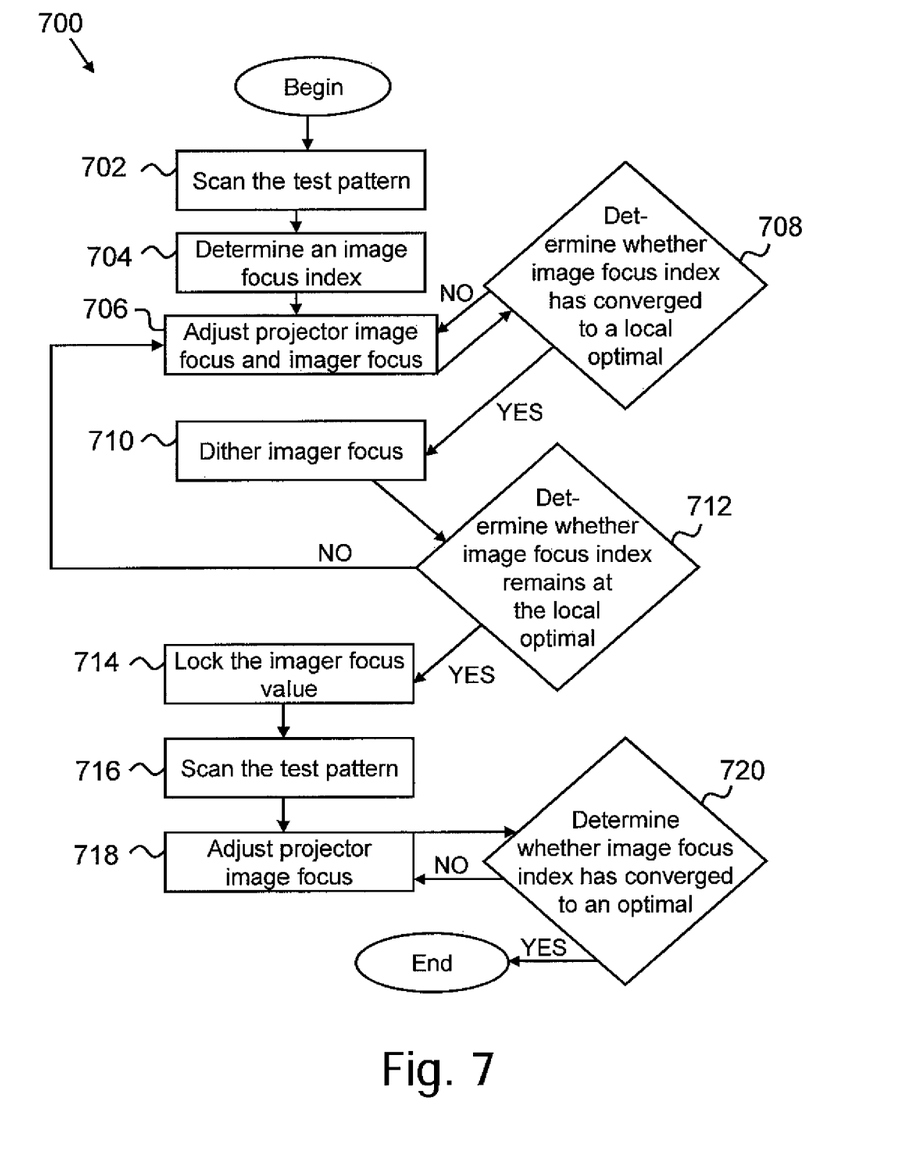
FIG. 7 is a schematic flow diagram of a procedure for determining a focus setting for a projector and an image sensor lens.

FIG. 7 is a schematic flow diagram of a procedure 700 for determining a focus setting for a projector and an image sensor lens. In certain embodiments, the procedure 700 may be utilized within a procedure such as that illustrated in FIG. 6, wherein operations 608-614 are replaced in whole or part by at least some of the operations of the procedure 700.

The procedure 700 includes an operation 702 to scan a test pattern and an operation 704 to determine an image focus index. The procedure 700 further includes an operation 706 to adjust a projector image focus and an imager focus, and a determination 708 whether the image focus index has converged to a local optimal value. If the image focus index has not converged to a local optimal value, the procedure 700 repeats the operation 706 to adjust the focus values.

If the image focus index has converged to a local optimal value, the procedure 700 further includes an operation 710 to dither the imager focus and a determination 712 of whether the imager focus remains at an optimal value (i.e. if no dithered values are more optimal than the local optimal value, the imager focus remains at the local optimal value). If the imager focus does not remain at an optimal value, the procedure 700 further repeats the operation 706 around the optimal dithered value until the image focus index is maximized. If the imager focus remains at the optimal value, the procedure 700 includes an operation 714 to lock the imager focus value. The procedure 700 further includes an operation 716 to scan the test pattern, an operation 718 to adjust the projector focus, and a determination 720 whether the image focus index has converged to an optimal value. If the image focus index has not converged to an optimal value, the procedure 700 repeats operation 718 adjusting the projector focus until the imager focus value is an optimal value.

Certain operations of FIG. 7 may be omitted in whole or part, certain operations not shown in FIG. 7 may be added, and operations may be performed in a different order or performed in an alternate manner.

One exemplary embodiment is a system including a manufacturing surface, an image projector, an imaging sensor, and an aperture disposed between the manufacturing surface and the imaging sensor. The imaging sensor is positioned at a first specified angle relative to the manufacturing surface and a first pixel row of the imaging sensor is positioned at a second angle relative to an edge of a test pattern projected onto the manufacturing surface. The exemplary system further includes a means for determining an image focus index, a means for adjusting a projector focus value, and a means for maximizing the image focus index.

The means for determining an image focus index includes a test pattern and an imaging device that scans the test pattern. The means for determining an image focus index further includes a computing device that determines a fundamental frequency of the test pattern and an amplitude of the fundamental frequency, for example a fundamental frequency of a pixel row of the test pattern. The means for determining the image focus index further includes determining an amplitude of at least one harmonic frequency of the test pattern, and determining the focusing index in response to the amplitude of the fundamental frequency and the amplitude(s) of the harmonic frequency(ies). An exemplary focusing index is a ratio between the amplitude of the fundamental frequency and the amplitude(s) of the harmonic frequency(ies).

The means for adjusting a projector focus value includes a controller that operates a focusing actuator or that provides an actuator command that adjusts a focus value of the imaging device. The focusing actuator moves the imaging device lens in response to the actuator command or the direct control by the controller. Examples of the means for maximizing the image focus index include adjusting the projector focus value until a maximum focusing index is observed, operating an optimization routine on the image focus index until an improvement in the focusing index lower than a threshold is observed, and/or dithering the projector focus value and maximizing the image focus index in response to the dithering.

In further embodiments, the system includes means for determining a skew indicator value. Examples of the means for determining the skew indicator value include determining a geometric skew ratio between a first portion of a test pattern and a second portion of the test pattern, where the first portion of the test pattern and second portion of the test pattern have a known geometric ratio and are spaced apart on the test pattern such that a substantial portion of a projected image plane is described within the first and second portions of the test pattern. An additional or alternative example of the means for determining the skew indicator value includes determining a brightness skew ratio between a first portion of a test pattern and a second portion of the test pattern, where the first portion of the test pattern and second portion of the test pattern have a known brightness ratio and are spaced apart on the test pattern such that a substantial portion of a projected image plane is described within the first and second portions of the test pattern. The determination of skew occurs by comparing the spacing of frequency signals (e.g. for the geometric skew) and/or the amplitude of frequency signals (e.g. for the brightness skew). The means for determining the skew indicator value further includes determining horizontal and/or vertical skew for the test pattern. The system further includes a means for tuning a projector skew adjustment in response to the skew indicator value. The means for tuning a projector skew adjustment includes adjusting a projector position and/or providing an optical skew correction until the skew indicator value is minimized.

A further embodiment of the system includes a means for determining a current zoom level. The means for determining a current zoom level includes determining a fundamental frequency for a test pattern to a predetermined frequency, and determining the zoom level in response to a difference between the fundamental frequency for the test pattern and the predetermined frequency. The system further includes a means for controlling the zoom level in response to the target zoom level. The means for controlling the zoom level includes an actuator that moves the projector and/or projector lens, and/or an actuator to move the projected image plane relative to the projector.

As is evident from the figures and text presented above, a variety of embodiments according to the present invention are contemplated.

One exemplary embodiment is a method including positioning an image sensor at a first specified angle to a projected image plane, projecting a test pattern onto the projected image plane, positioning an aperture between the image sensor and the projected image plane, positioning the image sensor such that a first pixel row of the image sensor is at a second angle to an edge of the test pattern, and iteratively scanning the test pattern and adjusting a projector focus value to maximize an image focus index, the image focus index comprising a function of at least one harmonic frequency amplitude of a test pattern scan. The first specified angle may be parallel, and the second angle may be parallel. In certain further embodiments, adjusting the projector focus value includes adjusting a projector lens position and/or adjusting a projection distance that is a distance between the projector and the projected image.

In certain further embodiments, the image focus index includes a root-mean-squared (RMS) amplitude value for a first harmonic frequency divided by an RMS amplitude value for the fundamental frequency (FF), a sum of RMS amplitude values for a plurality of harmonic frequencies divided by the RMS amplitude value for the FF, or a sum of RMS amplitude values for each harmonic frequency having an RMS amplitude value at least equal to 1% of the RMS amplitude value for the FF divided by the RMS amplitude value for the FF.

In certain embodiments, the aperture is a pinhole. In certain embodiments, the aperture includes an imager lens, and adjusting a projector focus value to maximize an image focus index further includes iteratively adjusting the imager lens position to maximize an imager focus value, and fixing the imager lens position. In certain further embodiments, the method includes dithering the imager lens position after adjusting the projector focus value, and re-adjusting the projector focus value in response to the dithering indicating the image focus index is not at a maximum value.

In certain embodiments, the method includes determining a skew indicator value, and tuning a projector skew adjustment in response to the skew indicator value. In certain embodiments, the skew indicator value includes a ratio of a first fundamental frequency to a second fundamental frequency and/or a ratio of a first fundamental frequency amplitude to a second fundamental frequency amplitude. In certain further embodiments, the skew indicator value includes a horizontal skew indicator value and/or a vertical skew indicator value. In certain embodiments, the projector skew adjustment includes a horizontal skew correction, a vertical skew correction, and/or a projector position. In certain embodiments, the method further includes interpreting a target zoom level, determining a current zoom level, and controlling the current zoom level in response to the target zoom level. In certain embodiments, determining the current zoom level includes interpreting a target fundamental frequency, and interpreting a fundamental frequency (FF) for the test pattern.

One exemplary embodiment is a system including a projector structured to project a test pattern onto a projected image plane, an image sensor positioned at a first specified angle relative to the projected image plane, wherein a first pixel row of the image sensor is positioned at a second angle relative to an edge of the test pattern, an aperture positioned between the image sensor and the projected image plane, a controller structured to iteratively scan the test pattern and adjust a projector focus value to maximize an image focus index, the image focus index comprising a function of at least one harmonic frequency amplitude of a test pattern scan, and the projector is further structured to project a production image onto a manufacturing surface.

In certain embodiments, the aperture includes one of a pinhole and an imager lens. In certain embodiments, the image sensor includes one of a charge-coupled device (CCD) and a complementary metal-oxide-semiconductor (CMOS). In certain embodiments, the manufacturing surface includes a photosensitive polymer layer. In certain embodiments, the controller is further structured to adjust the projector focus value by commanding a projector lens position actuator and/or a projection distance actuator.

In certain embodiments, the image focus index includes a root-mean-squared (RMS) amplitude values for a first harmonic frequency divided by an RMS amplitude value for the fundamental frequency (FF), a sum of RMS amplitude values for a plurality of harmonic frequencies divided by the RMS amplitude value for the FF, or a sum of RMS amplitude values for each harmonic frequency having an RMS amplitude value at least equal to 1% of the RMS amplitude value for the FF divided by the RMS amplitude value for the FF. In certain embodiments, the projector further includes a skew adjustment including a horizontal skew correction, a vertical skew correction, and/or a projector position, and the controller is further structured to determine a skew indicator value, and to tune the projector skew adjustment in response to the skew indicator value. In certain embodiments, the skew indicator value includes a ratio of a first fundamental frequency to a second fundamental frequency and/or a ratio of a first fundamental frequency amplitude to a second fundamental frequency amplitude. In certain embodiments, the skew indicator value includes a horizontal skew indicator value and/or a vertical skew indicator value.

In certain embodiments, the controller is further structured to interpret a target zoom level, to determine a current zoom level, and to control the current zoom level in response to the target zoom level. In certain embodiments, the controller is further structured to determine the current zoom level by interpreting a target fundamental frequency, and interpreting a fundamental frequency (FF) for the test pattern.

One exemplary embodiment is an apparatus including a scanning module structured to provide an image sensor scan command, where an image sensor creates a test pattern scan in response to the image sensor scan command, where the test pattern scan includes a scan of a test pattern projected onto a manufacturing surface. In certain further embodiments, the apparatus includes a focus definition module structured to determine an image focus index comprising a function of at least one harmonic frequency amplitude of the test pattern scan, and a focus control module structured to iteratively adjust a projector focus value to maximize the image focus index.

In certain further embodiments, the focus control module is further structured to iteratively adjust an imager lens position to maximize the image focus index, and the apparatus further includes an imager focus verification module structured to dither the imager lens position, where the focus control module is further structured to re-adjust the projector focus value in response to the dithering of the imager lens position indicating that the image focus index is not at a maximum value. In certain further embodiments, the apparatus includes a skew control module structured to determine a skew indicator value as a function of a first fundamental frequency value and a second fundamental frequency value, and to tune a projector skew adjustment in response to the skew indicator value. In certain further embodiments, the projector skew adjustment includes a horizontal skew correction, a vertical skew correction, and/or a projector position.

In certain further embodiments, the skew indicator value includes a ratio of a first fundamental frequency to a second fundamental frequency and a ratio of a first fundamental frequency amplitude to a second fundamental frequency amplitude. In certain further embodiments, the skew indicator value includes a horizontal skew indicator value and a vertical skew indicator value. In certain further embodiments, the apparatus includes a zoom control module structured to interpret a target zoom level, to determine a current zoom level, and to provide a zoom level command in response to the target zoom level. In certain further embodiments, the zoom control module is further structured to determine the current zoom level by interpreting a target fundamental frequency, and interpreting a fundamental frequency (FF) for the test pattern.

One exemplary embodiment is a system including a manufacturing surface, an image projector, an imaging sensor, and an aperture disposed between the manufacturing surface and the imaging sensor. In certain embodiments, the imaging sensor is positioned at a first specified angle to the manufacturing surface and a first pixel row of the imaging sensor is positioned at a second angle to an edge of a test pattern projected onto the manufacturing surface. In certain embodiments, the system further includes means for determining an image focus index, means for adjusting a projector focus value, and means for maximizing the image focus index. In certain embodiments, the system further includes means for determining a skew indicator value, and means for tuning a projector skew adjustment in response to the skew indicator value. In certain embodiments, the system further includes means for determining a current zoom level, and means for controlling the current zoom level in response to a target zoom level.

While the invention has been described in connection with particular illustrative embodiments, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
   positioning an image sensor at a first specified angle relative to a projected image plane;
   projecting a test pattern onto the projected image plane;
   positioning an aperture between the image sensor and the projected image plane;
   positioning the image sensor such that a first pixel row of the image sensor is at a second angle relative to an edge of the test pattern;
   iteratively scanning the test pattern and adjusting a projector focus value to maximize an image focus index, the image focus index comprising a function of at least one harmonic frequency amplitude of a test pattern scan.

2. The method of claim 1, wherein adjusting the projector focus value comprises at least one of adjusting a projector lens position and adjusting a projection distance comprising a distance between the projector and the projected image.

3. The method of claim 1, wherein the image focus index comprises a member selected from the group consisting of a root-mean-squared (RMS) amplitude value for a first harmonic frequency divided by an RMS amplitude value for the fundamental frequency (FF), a sum of RMS amplitude values for a plurality of harmonic frequencies divided by the RMS amplitude value for the FF, and a sum of RMS amplitude values for each harmonic frequency having an RMS amplitude value at least equal to 1% of the RMS amplitude value for the FF divided by the RMS amplitude value for the FF.

4. The method of claim 1, wherein the aperture comprises a pinhole.

5. The method of claim 1, wherein the aperture comprises an imager lens, and wherein adjusting a projector focus value to maximize an image focus index further includes iteratively adjusting the imager lens position to maximize an imager focus value, and fixing the imager lens position.

6. The method of claim 5, further comprising dithering the imager lens position after adjusting the projector focus value, and re-adjusting the projector focus value in response to the dithering indicating the image focus index is not at a maximum value.

7. The method of claim 1, further comprising determining a skew indicator value, and tuning a projector skew adjustment in response to the skew indicator value.

8. The method of claim 7, wherein the skew indicator value comprises at least one of a ratio of a first fundamental frequency to a second fundamental frequency and a ratio of a first fundamental frequency amplitude to a second fundamental frequency amplitude.

9. The method of claim 8, wherein the skew indicator value comprises at least one of a horizontal skew indicator value and a vertical skew indicator value.

10. The method of claim 8, wherein the projector skew adjustment comprises at least one member selected from the group consisting of a horizontal skew correction, a vertical skew correction, and a projector position.

11. The method of claim 1, further comprising interpreting a target zoom level, determining a current zoom level, and controlling the current zoom level in response to the target zoom level wherein determining the current zoom level comprises interpreting a target fundamental frequency, and interpreting a fundamental frequency (FF) for the test pattern.

12. A system, comprising:
a projector structured to project a test pattern onto a projected image plane;
an image sensor positioned at a first specified angle relative to the projected image plane, wherein a first pixel row of the image sensor is positioned at a second angle relative to an edge of the test pattern;
an aperture positioned between the image sensor and the projected image plane;
a controller structured to iteratively scan the test pattern and adjust a projector focus value to maximize an image focus index, the image focus index comprising a function of at least one harmonic frequency amplitude of a test pattern scan; and
wherein the projector is further structured to project a production image onto a manufacturing surface.

13. The system of claim 12, wherein the aperture comprises one of a pinhole and an imager lens.

14. The system of claim 12, wherein the image sensor comprises one of a charge-coupled device (CCD) and a complementary metal-oxide-semiconductor (CMOS).

15. The system of claim 12, wherein the manufacturing surface comprises a photosensitive polymer layer.

16. The system of claim 12, wherein the controller is further structured to adjust the projector focus value by commanding at least one of a projector lens position actuator and a projection distance actuator.

17. The system of claim 12, wherein the image focus index comprises a member selected from the group consisting of a root-mean-squared (RMS) amplitude value for a first harmonic frequency divided by an RMS amplitude value for the fundamental frequency (FF), a sum of RMS amplitude values for a plurality of harmonic frequencies divided by the RMS amplitude value for the FF, and a sum of RMS amplitude values for each harmonic frequency having an RMS amplitude value at least equal to 1% of the RMS amplitude value for the FF divided by the RMS amplitude value for the FF.

18. The system of claim 12, wherein the projector further includes a skew adjustment comprising at least one member selected from the group consisting of a horizontal skew correction, a vertical skew correction, and a projector position, and wherein the controller is further structured to determine a skew indicator value, and to tune the projector skew adjustment in response to the skew indicator value.

19. The system of claim 18, wherein the skew indicator value comprises at least one of a ratio of a first fundamental frequency to a second fundamental frequency and a ratio of a first fundamental frequency amplitude to a second fundamental frequency amplitude.

20. The system of claim 18, wherein the skew indicator value comprises at least one of a horizontal skew indicator value and a vertical skew indicator value.

21. The system of claim 12, wherein the controller is further structured to interpret a target zoom level, to determine a current zoom level, and to control the current zoom level in response to the target zoom level.

22. The system of claim 12, wherein the controller is further structured to determine the current zoom level by interpreting a target fundamental frequency, and interpreting a fundamental frequency (FF) for the test pattern.

23. The system of claim 12, wherein the first specified angle comprises a parallel angle.

24. The system of claim 12, wherein the second angle comprises a parallel angle.

25. An apparatus, comprising:
a scanning module structured to provide an image sensor scan command, wherein an image sensor creates a test pattern scan in response to the image sensor scan command, wherein the test pattern scan comprises a scan of a test pattern projected onto a manufacturing surface;
a focus definition module structured to determine an image focus index comprising a function of at least one harmonic frequency amplitude of the test pattern scan; and
a focus control module structured to iteratively adjust a projector focus value to maximize the image focus index.

26. The apparatus of claim 25, wherein the focus control module is further structured to iteratively adjust an imager lens position to maximize the image focus index, the apparatus further comprising an imager focus verification module structured to dither the imager lens position, and wherein the focus control module is further structured to re-adjust the projector focus value in response to the dithering of the imager lens position indicating that the image focus index is not at a maximum value.

27. The apparatus of claim 25, further comprising a skew control module structured to determine a skew indicator value as a function of a first fundamental frequency value and a second fundamental frequency value, and to tune a projector skew adjustment in response to the skew indicator value.

28. The apparatus of claim 27, wherein the projector skew adjustment includes at least one member selected from the group consisting of a horizontal skew correction, a vertical skew correction, and a projector position.

29. The apparatus of claim 28, wherein the zoom control module is further structured to determine the current zoom level by interpreting a target fundamental frequency, and interpreting a fundamental frequency (FF) for the test pattern.

30. The apparatus of claim 27, wherein the skew indicator value comprises at least one of a ratio of a first fundamental frequency to a second fundamental frequency and a ratio of a first fundamental frequency amplitude to a second fundamental frequency amplitude.

31. The apparatus of claim 25, further comprising a zoom control module structured to interpret a target zoom level, to determine a current zoom level, and to provide a zoom level command in response to the target zoom level.

32. The apparatus of claim 25, wherein the image focus index comprises a member selected from the group consisting of a root-mean-squared (RMS) amplitude value for a first harmonic frequency divided by an RMS amplitude value for the fundamental frequency (FF), a sum of RMS amplitude values for a plurality of harmonic frequencies divided by the RMS amplitude value for the FF, and a sum of RMS amplitude values for each harmonic frequency having an RMS amplitude value at least equal to 1% of the RMS amplitude value for the FF divided by the RMS amplitude value for the FF.

33. A system, comprising:
- a manufacturing surface, an image projector, an imaging sensor, and an aperture disposed between the manufacturing surface and the imaging sensor;
- wherein the imaging sensor is positioned at a first specified angle relative to the manufacturing surface and a first pixel row of the imaging sensor is positioned at a second angle relative to an edge of a test pattern projected onto the manufacturing surface;
- means for maximizing an image focus index;
- means for iteratively scanning the test pattern and adjusting a projector focus value; and
- wherein in the means for maximizing the image focus index, the image focus index comprises a function of at least one harmonic frequency amplitude of a test pattern scan.

34. The system of claim 33, further comprising means for determining a skew indicator value, means for tuning a projector skew adjustment in response to the skew indicator value.

35. The system of claim 33, further comprising means for determining a current zoom level, and means for controlling the current zoom level in response to a target zoom level.

36. The system of claim 33, wherein the image focus index comprises a member selected from the group consisting of a root-mean-squared (RMS) amplitude value for a first harmonic frequency divided by an RMS amplitude value for the fundamental frequency (FF), a sum of RMS amplitude values for a plurality of harmonic frequencies divided by the RMS amplitude value for the FF, and a sum of RMS amplitude values for each harmonic frequency having an RMS amplitude value at least equal to 1% of the RMS amplitude value for the FF divided by the RMS amplitude value for the FF.

* * * * *